United States Patent [19]

Mueller et al.

[11] Patent Number: 4,820,092
[45] Date of Patent: Apr. 11, 1989

[54] TOUCH SENSING METHOD AND APPARATUS

[75] Inventors: Richard Mueller; Guenter Fietzke, both of Lynchburg, Va.

[73] Assignee: American Hofmann Corporation, Lynchburg, Va.

[21] Appl. No.: 116,307

[22] Filed: Nov. 4, 1987

[51] Int. Cl.$^4$ .............................................. B23C 9/00
[52] U.S. Cl. ........................................ 409/133; 408/2; 408/16
[58] Field of Search ............................ 409/133; 408/2; 364/508; 279/2 A

[56] References Cited

U.S. PATENT DOCUMENTS 3,507,157 4/1970 Hack .
3,817,149 6/1974 Reutlinger ........................ 409/133
3,835,712 9/1974 Muller .
3,861,817 1/1975 Muller .
4,234,200 11/1980 Orem et al. ........................ 279/2 A
4,262,536 4/1981 Orem et al. ........................ 364/508

FOREIGN PATENT DOCUMENTS 0074416 1/1986 European Pat. Off. .

Primary Examiner—Léon Scott, Jr.
Attorney, Agent, or Firm—Cushman, Darby & Cushman

[57] ABSTRACT

An apparatus and method for balancing a workpiece in which material is removed by advancing a drill, mill or the like into contact with the workpiece and thereafter removing material therefrom. A force transducer is coupled to the workpiece or tool holder to produce an electrical signal in response to the force resulting from contact between the tool and the workpiece to reliably and accurately indicate contact for zero depth reference of the material removing operation.

35 Claims, 2 Drawing Sheets

4,820,092

TOUCH SENSING METHOD AND APPARATUS

BACKGROUND AND SUMMARY OF THE INVENTION

The invention relates to a method and apparatus for balancing of workpieces by removal of surface portions thereof.

Many types of workpieces, particularly rotors, must be balanced after manufacture and before they can be used. This is particularly true of rotors such as electric motors which must rotate at high speeds and therefore must be well balanced in order to avoid excessive noise, vibration and other undesirable effects.

Typically, these kinds of rotors are balanced by conventional machines which determine the angle and amount of imbalance and calculate where material should be removed in order to balance the rotor. The rotor is then automatically or manually positioned with respect to a mill, drill, grinder or the like which is then advanced to contact the desired position or positions or vice versa and to remove the desired amount of material.

Typically, the amount of material removed is varied by varying the depth to which drilling, grinding or milling takes place. However, in order to accurately determine the depth, it is necessary to accurately determine when the drill or mill contacts the surface of the rotor. One way to do this is to isolate the tool and rotor from ground and apply a D.C. voltage therebetween. The electrical connection which takes place when the metallic tool touches the metallic rotor can be easily detected to provide an indication of contact. However, the difficulty with this arrangement is that the chips which are removed from workpieces frequently will bridge between the tool and a workpiece providing an inaccurate indication of contact. Since the depth of drilling must be very accurate to effectively balance the workpiece, this small error leads to workpieces which are entirely unsatisfactory. While the use of an AC current and an adjacent induction coil to determine when current flows between the tool and the rotor avoids problems arising from trying to isolate the tool and workpiece holder, the same problem of bridging by metallic chips still exists.

Another alternative which has been utilized is to mount the tool or workpiece holder in a spring holder so that it presses backward to close a mechanical switch at the time of contact. This arrangement too has a number of disadvantages. The spring-loaded holding arrangement is mechanically complex and may require modification of conventional drills, mills, grinders and other tools. Moreover, the mechanical switch can fail and the spring is likewise subject to wear.

The present invention relates to an improved apparatus of this type in which a force transducer is coupled to the workpiece or tool holder, at a position so that it produces an electrical signal in response to the force resulting from contact between the tool and the workpiece. A force transducer is a relatively inexpensive and reliable device. Moreover, by coupling that device to the workpiece holder, no structural modification need be made in the tool which removes material from the workpiece.

In a first embodiment of the invention, the force transducer, for example, a piezoelectric transducer, is mounted between a base member and a clamping member constituting the workpiece holder. The rotor to be balanced is clamped between a pair of jaws and the members are connected together by a threaded screw or the like which is preloaded by a spring. The force transducer is mounted between the members adjacent the screw so that when the drill contacts the surface of the rotor at the position where material is to be removed, the resultant change in force applied to the force transducer produces a change in voltage. This voltage change is then applied through an amplifier which operates as a kind of level detector to produce an output signal only when a threshold voltage has been exceeded. The output of this amplifier in turn sets zero in a conventional feed motor controller which responds to a signal from a suitable conventional balancing circuit to produce an output to the running feeding motor to further advance a drill for a predetermined distance which will remove the desired amount of material and effect balancing of the rotor. The drill can approach the rotor in fast feed until the rotor is touched and the switch to slow speed which saves time in an automated process.

According to a second embodiment of the invention, the force transducer is similarly mounted in a holder which includes a mill spindle and cutter against which the workpiece holder and the workpiece are advanced. Each time a tooth of the mill contacts the surface of the rotor, a pulse will be produced by the force transducer which is applied to filter and amplifier circuit tuned to the frequency of teeth of the mill cutter and the speed at rotation thereof. Thus, the amplifier passes the pulse train only when its frequency indicates that the signal comes from the operation of the mill. A level detector then determines whether the pulses are of sufficient amplitude. A stepper motor is then similarly controlled by a conventional control circuit to advance the rotor and remove the desired material.

DETAILED DESCRIPTION OF THE DRAWINGS

Figure 1:
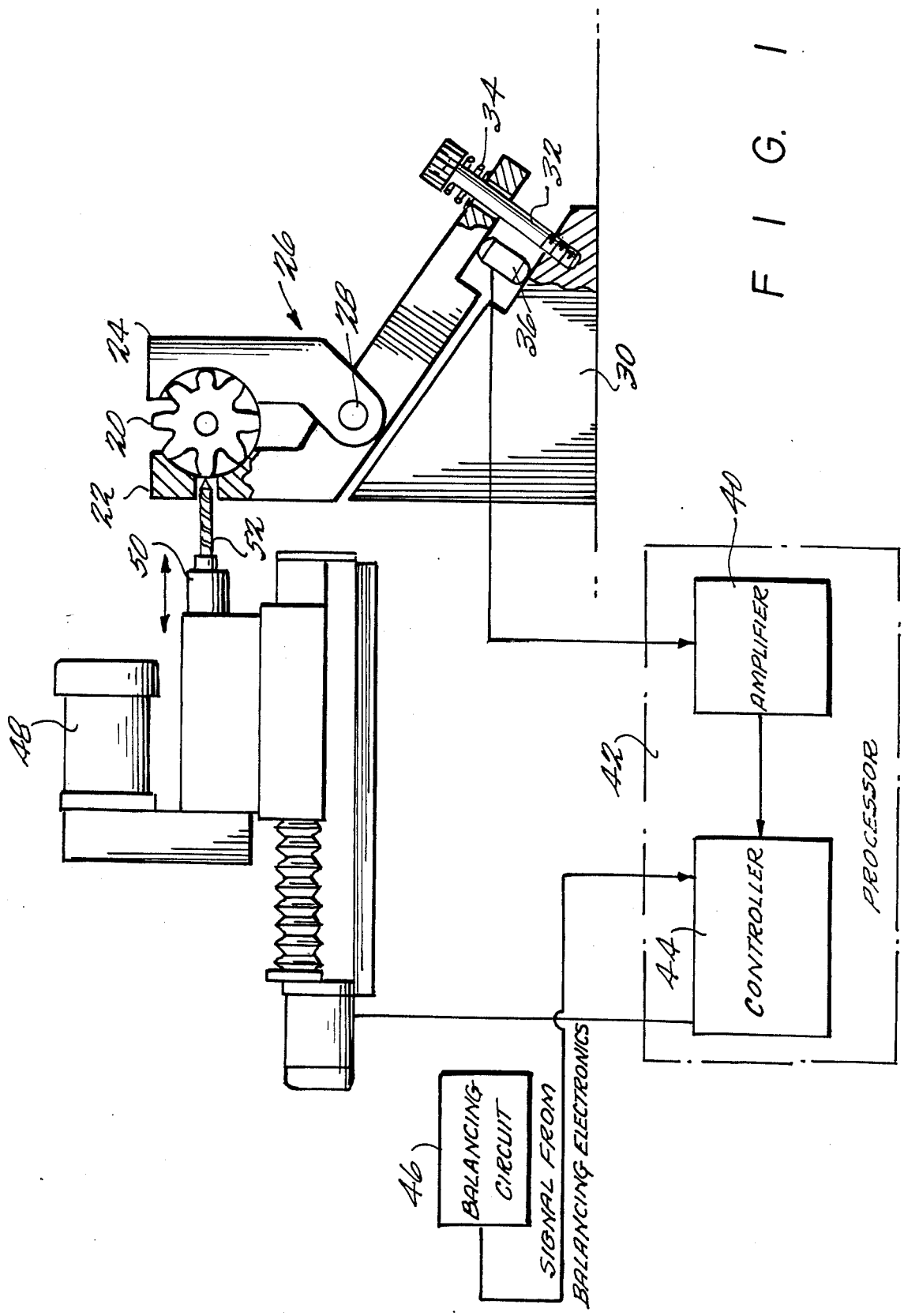
FIG. 1 shows a first embodiment of the present invention in which material is removed from a rotor by a drill.

Reference is now made to FIG. 1 which illustrates a first embodiment of the present invention. In this invention a rotor 20 to be balanced, for example, a rotor from a small electrical motor is placed between a pair of jaws 22 and 24 of a clamping member generally indicated as 26. Jaws 22 and 24 are connected together at a suitable pivot 28 and conventional structure (not shown) provided to clamp the two jaws together with rotor 20 therebetween. Clamping member 26 is connected to a base member 30 by means of screw 32 extending through member 26 and threaded into base member 30. Spring 34, which may be any kind of suitable spring, provides a preload onto force transducer 36 which is mounted between members 26 and 30 adjacent screw 32. Force transducer 36 may be any suitable kind of transducer and preferably is a piezoelectric transducer. However, strain gages and other transducers of this sort may be alternatively employed.

The voltage output from the force transducer 36 is applied to an amplifier 40 comprising a portion of processor circuit 42. Amplifier 40 in effect operates as a level detector to produce an output only when the threshold voltage from the transducer is sufficient to indicate that the tool has made contact with rotor 20. The output of amplifier 40 is in turn applied to conventional feed motor control 44 which also receives a signal from a conventional balancing circuit 46 indicating the amount of material to be removed from the workpiece. Feed motor control 44 conventionally controls stepper motor 48 which advances drill 50 until bit 52 contacts directly the surface of rotor 20. Bit 52 then further advances into the material until the desired depth has been reached where a zero for depth counting was set by the output of processor 42.

Figure 2:
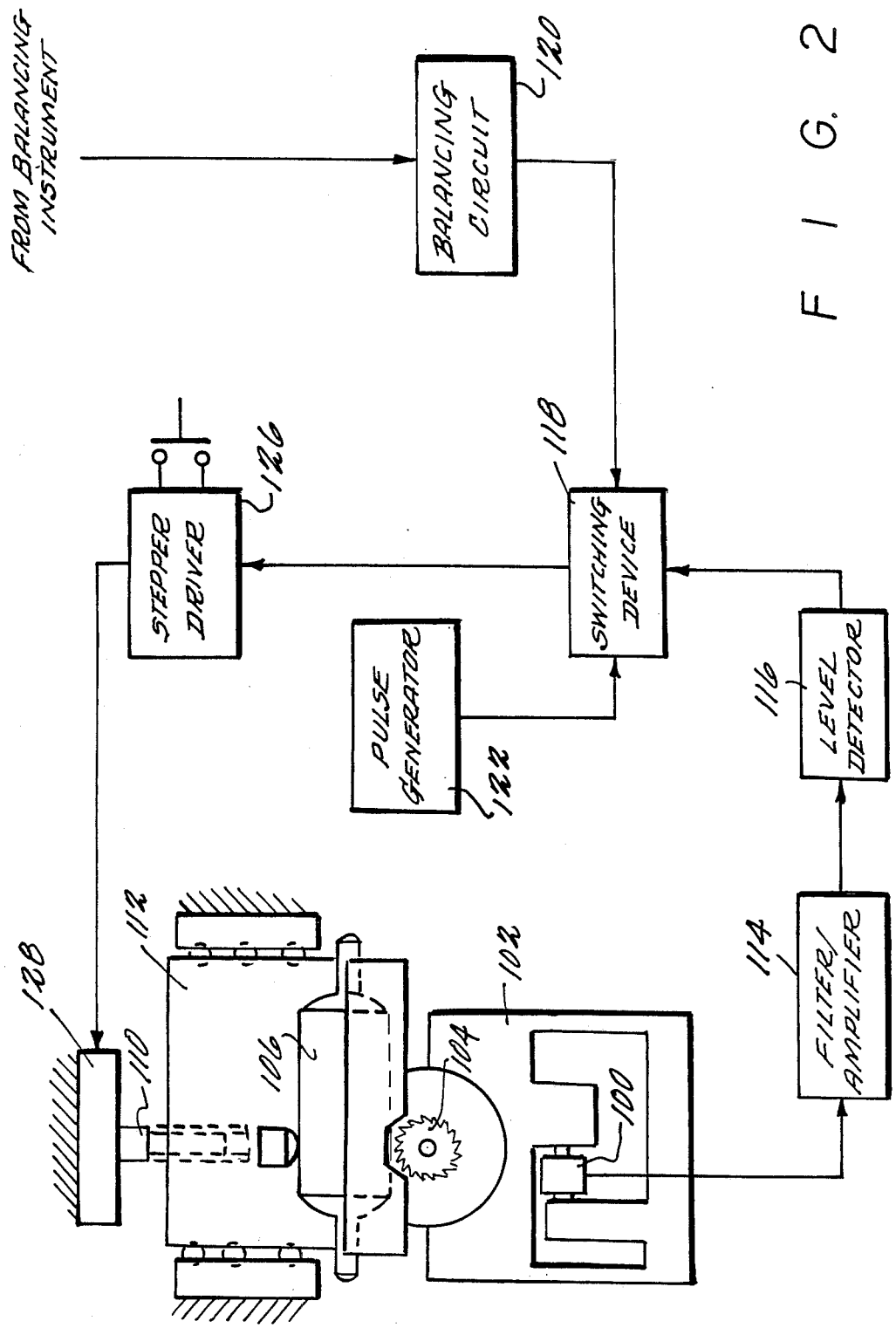
FIG. 2 shows a second embodiment of the invention in which material is removed from a rotor by a mill.

FIG. 2 illustrates a second and similar embodiment of the invention likewise using a force transducer. However, in the arrangement of FIG. 2, the force transducer 100 is mounted within a leaf spring portion holder 102 for a spindle mounted mill 104 rather than in the workpiece holder as in FIG. 1. The workpiece to be milled, in this case, rotor 106, is advanced by stepper motor 108 through a lead screw 110 and conventional clamping mechanism 112. As the cutter of mill 104 contacts the surface of rotor 106, force transducer 100 produces a train of pulses in response thereto as each individual tooth of the cutter sequentially contacts the surface of rotor 106. Filter 114 is tuned to the frequency of the pulses produced by the force transducer 100 and therefore produces an output only when the pulses result from milling. Level detector 116 determines whether the output is sufficient and applies a signal to a switching circuit 118 which also receives a signal from the balance circuit 120 indicating the amount of material to be removed. Pulses from a conventional generator 122 are applied via switching device 118 to the stepper driver circuit 126 which in turn controls stepper motor 128.

Many changes and modifications in the above-described embodiment of the invention can of course be carried out without departing from the scope thereof. Accordingly, that scope is intended to be limited only by the scope of the appended claims.

What is claimed is:

1. An apparatus for balancing a workpiece comprising:
    means for removing a portion of said workpiece;
    means for mounting said workpiece and removing means;
    means for causing relative motion between said removing means and said workpiece to bring said removing means into contact with, and thereafter remove material from, said workpiece at a predetermined location;
    force transducer means coupled to said mounting means for producing a first electrical signal in response to the force resulting from contact between said removing means and said workpiece to indicate contact;
    means for determining the amount of material to be removed from said workpiece at said predetermined location and producing a second electrical signal indicating said amount of material to be removed; and
    control means for receiving said first and second signals and controlling said motion controlling means to remove said determined amount of material.

2. An apparatus as in claim 1 wherein said removing means is a drill.

3. An apparatus as in claim 1 wherein said removing means is a mill.

4. An apparatus as in claim 1 wherein said removing means is a grinder.

5. An apparatus as in claim 1 wherein said force transducer is a piezoelectric transducer.

6. An apparatus as in claim 1 wherein said motion causing means includes a stepper feed motor and said control means includes a feed motor controller responsive to said first and second signals.

7. An apparatus as in claim 1 wherein said mounting means includes a base member and a workpiece clamping member for mounting a workpiece to be treated and wherein said force transducer means is mounted between said members.

8. An apparatus as in claim 1 wherein said mounting means includes a base member and a rotary workpiece mill spindle member for mounting a rotary mill connected to said base member by a spring portion and wherein said force transducer is mounted between said mill spindle member and said base member.

9. An apparatus as in claim 1 wherein said removing means includes a rotary mill having a cutter, wherein said mounting means includes a mill spindle member for mounting said rotary mill and means for rotating said mill spindle to mill an adjacent workpiece and wherein said motion causing means includes a stepper motor for advancing said workpiece in a direction transverse to the axis of rotation of said spindle to contact said workpiece so that said force transducer means produces an electrical signal in the form of a series of pulses at a pulse frequency varying as a function of the speed of rotation of said mill spindle and the frequency of teeth of the cutter and wherein said control means includes a filter for passing a pulse signal at said pulse frequency, a level detector connected to the output of said filter for producing an output signal only when the level of pulses exceeds a predetermined level, means for producing pulses and switching means for applying said pulses from said pulse producing means to said stepper motor when said level detector is producing an output signal and until material indicated by said determining means has been removed.

10. An apparatus as in claim 1 wherein said removing means is a drill, wherein said mounting means includes means for clamping said workpiece, wherein said motion causing means includes a stepper motor for advancing said drill and wherein said control means includes an amplifier connected to the output of said force transducer and a feed motor controller connected to said amplifier for operating said stepper motor when said amplifier is producing an output signal and until said material indicated by said determining means has been removed.

11. An apparatus for removing material from a workpiece comprising:
    means for removing a portion of said workpiece;
    means for mounting said workpiece;
    stepper motor means for causing relative movement between removing means and said workpiece;
    force transducer means coupled to said mounting means so that contact between said workpiece and said removing means applies a force to said transducer means and said force transducer means produces an electrical output signal;
    control means connected to said force transducer means and adapted to receive a signal indicating a predetermined amount of material to be removed and producing a control signal for said stepper motor means to bring said removing means and said workpiece into contact to remove said predetermined amount of material.

12. An apparatus as in claim 11 wherein said removing means is a drill.

13. An apparatus as in claim 11 wherein said removing means is a mill.

14. An apparatus as in claim 11 wherein said removing means is a grinder.

15. An apparatus as in claim 11 wherein said force transducer is a piezoelectric transducer.

16. An apparatus as in claim 11 wherein said stepper motor means includes a stepper feed motor and said control means includes a feed motor controller responsive to said first and second signals.

17. An apparatus as in claim 11 wherein said mounting means includes a base member and a workpiece clamping member for mounting a workpiece to be treated and wherein said force transducer is mounted between said members.

18. An apparatus as in claim 11 wherein said mounting means includes a base member and a rotary workpiece mill spindle member for mounting a rotary mill connected to said base member by a spring portion and wherein said force transducer is mounted between said mill spindle member and said base member.

19. An apparatus as in claim 11 wherein said removing means includes a rotary mill having a cutter wherein said mounting means includes a mill spindle member for mouting said rotary mill and means for rotating said spindle to mill an adjacent workpiece mounted thereon and wherein said stepper motor means advances said workpiece in a direction transverse to the axis of rotation of said spindle to contact said workpiece so that said force transducer means produces an electrical signal in the form of a series of pulses at a pulse frequency varying as a function of the speed of rotation of said mill spindle and the frequency of teeth of the cutter and wherein said control means includes a filter for passing a pulse signal at said pulse frequency, a level detector connected to the output of said filter for producing an output signal only when the level of pulses exceeds a predetermined level, means for producing pulses and switching means for applying said pulses from said pulse producing means to said stepper motor when said level detector is producing an output signal and until material indicated by said determining means has been removed.

20. An apparatus as in claim 11 wherein said removing means is a drill, wherein said mounting means includes means for clamping said workpiece, and wherein said control means includes an amplifier connected to the output of said force transducer and a feed motor controller connected to said amplifier for operating said stepper motor when said amplifier is producing an output signal and until said material indicated by said determining means has been removed.

21. An apparatus for removing material from a workpiece comprising:
means for removing a portion of said workpiece;
means for mounting said workpiece and removing means for relative motion therebetween;
means for moving said workpiece and removing means with respect to each other so that said removing means contacts a surface of said workpiece to remove material;
force transducer means coupled to said mounting means so that contact between said workpiece and removing means changes the force applied to said transducer means and said transducer means produces an electrical output signal in response thereto;
control means for receiving a signal indicating the amount of material to be removed and receiving said output signal of said transducer means and controlling said moving means in accordance therewith.

22. An apparatus as in claim 21 wherein said removing means is a drill.

23. An apparatus as in claim 21 wherein said removing means is a mill.

24. An apparatus as in claim 21 wherein said removing means is a grinder.

25. An apparatus as in claim 21 wherein said force transducer is a piezoelectric transducer.

26. An apparatus as in claim 21 wherein said motion causing means includes a stepper feed motor and said control means includes a feed motor controller responsive to said first and second signals.

27. An apparatus as in claim 21 wherein said mounting means includes a base member and a workpiece clamping member for mounting a workpiece to be treated and wherein said force transducer is mounted between said members.

28. An apparatus as in claim 21 wherein said mounting means includes a base member and a rotary workpiece mill spindle connected to said base member by a spring portion and wherein said force transducer is imprinted between said mill spindle and said base member.

29. An apparatus as in claim 21 wherein said removing means includes a rotary mill having a cutter, wherein said mounting means includes a mill spindle and means for rotating said spindle to mill an adjacent workpiece and wherein said motion causing means includes a stepper motor for advancing said workpiece in a direction transverse to the axis of rotation of said spindle to contact said workpiece so that said force transducer means produces an electrical signal in the form of a series of pulses at a pulse frequency varying as a function of the speed of rotation of said mill spindle and the frequency of teeth of the cutter and wherein said control means includes a filter for passing pulse signal at said pulse frequency, a level detector connected to the output of said filter for producing an output signal only when the level of pulses exceeds a predetermined level, means for producing pulses and switching means for applying said pulse from said pulse producing means to said stepper motor when said level detector is producing an output signal and until material indicated by said determining means has been removed.

30. An apparatus as in claim 21 wherein said removing means is a drill, wherein said mounting means includes means for clamping said workpiece, wherein said motion causing means includes a stepper motor for advancing said drill and wherein said control means includes an amplifier connected to the output of said force transducer and a feed motor controller connected to said charge amplifier for operating said stepper motor when said amplifier is producing an output signal and until said material indicated by said determining means has been removed.

31. A method of balancing a rotor comprising the steps of:

mounting said workpiece in a holder;
advancing material removing means into contact with a predetermined location on said workpiece;
detecting the output signal from a force transducer coupled to said holder so that said contact applies a force to said transducer which then produces said output signal;
determining from a balancing signal indicating the amount of material to be removed at said predetermined location the distance said removing means is to be advanced from said contact; and
advancing said material removing means said distance from said contact to remove said amount of material.

32. A method of removing material from a workpiece comprising the steps of:
advancing a workpiece removing means into contact with said workpiece mounted in a holder;
detecting the output signal of a force transducer coupled to said holder so that said contact applies a force to said transducer which then produces said output signal;
further advancing said removing means after said output signal is produced for a distance to remove a predetermined amount of material.

33. A workpiece holder comprising:
a base member;
a rotary workpiece mill spindle connected to said base member by a leaf spring portion; and
a force transducer mounted between said base member and mill spindle so that the force applied to said mill spindle by contact of said workpiece with a mill causes the force applied to said force transducer to change and an electrical signal to be thereby produced indicating the contact.

34. A workpiece holder comprising:
a base member;
a workpiece clamping member for mounting a workpiece to be treated;
means for coupling said members together about a pivot axis; and
a force transducer mounted between said members adjacent said pivot axis so that a force applied to a workpiece in said clamping member upon contact with a drill causes the force applied to said force transducer to change and an electrical signal to be thereby produced indicating the contact.

35. A holder as in claim 34 wherein said coupling means includes a threaded member extending through one of said members and engaging the other of said member, means engaging said threaded member and said one member for applying a preload force therebetween and wherein said force transducer is mounted between said clamping member and base member adjacent said threaded member.

* * * * *